(12) United States Patent
Parisi et al.

(10) Patent No.: US 11,344,812 B1
(45) Date of Patent: May 31, 2022

(54) SYSTEM AND METHOD FOR PROGRESSIVE ENHANCEMENT OF IN-APP AUGMENTED REALITY ADVERTISING

(71) Applicant: Unity Technologies SF, San Francisco, CA (US)

(72) Inventors: Anthony Salvatore Parisi, San Francisco, CA (US); Katrina Rose Stagg, Los Angeles, CA (US)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 16/904,532

(22) Filed: Jun. 17, 2020

Related U.S. Application Data

(60) Provisional application No. 62/862,533, filed on Jun. 17, 2019.

(51) Int. Cl.
| | |
|---|---|
| *A63F 13/00* | (2014.01) |
| *A63F 13/61* | (2014.01) |
| *A63F 13/533* | (2014.01) |
| *A63F 13/213* | (2014.01) |
| *G06Q 30/02* | (2012.01) |

(52) U.S. Cl.
CPC ............ *A63F 13/61* (2014.09); *A63F 13/213* (2014.09); *A63F 13/533* (2014.09); *G06Q 30/0276* (2013.01); *A63F 2300/1087* (2013.01); *A63F 2300/5506* (2013.01); *A63F 2300/8082* (2013.01)

(58) Field of Classification Search
CPC .................................................. G06T 19/006
See application file for complete search history.

(56) References Cited

U.S. PATENT DOCUMENTS

| | | | | |
|---|---|---|---|---|
| 2015/0235267 A1* | 8/2015 | Steube | ............... | H04N 21/4223 705/14.58 |
| 2018/0357670 A1* | 12/2018 | DeLuca | ............... | G06K 9/6201 |
| 2019/0213325 A1* | 7/2019 | McKerchar | ............. | G06F 21/53 |

* cited by examiner

*Primary Examiner* — Omkar A Deodhar
*Assistant Examiner* — Eric M Thomas
(74) *Attorney, Agent, or Firm* — Schwegman Lundberg & Woessner, P.A.

(57) ABSTRACT

A method of performing operations for executing a progressive interactive augmented reality (AR) advertisement display during execution of a running application is disclosed. based on a receiving of a first trigger event from the running application, a first aspect of the progressive AR advertisement is executed within a display window while the application is executing. The first aspect includes an interactive advertisement. Based on a receiving of a second trigger event from within the first aspect of the progressive AR advertisement, a second aspect of the progressive AR advertisement is executed in the display window while the application is executing. The second aspect includes an interactive AR advertisement.

18 Claims, 4 Drawing Sheets

SYSTEM AND METHOD FOR PROGRESSIVE ENHANCEMENT OF IN-APP AUGMENTED REALITY ADVERTISING

CROSS-REFERENCE TO RELATED APPLICATIONS

This application claims the benefit of U.S. Provisional Application No. 62/862,533, filed Jun. 17, 2019, which is incorporated by reference herein in its entirety.

TECHNICAL FIELD

The subject matter disclosed herein generally relates to the technical field of computer systems and, more specifically, to computer systems and methods for creating and manipulating augmented reality advertising.

BACKGROUND OF THE INVENTION

In the course of playing a video game or using a mobile application, from time to time, a user may be enticed to experience advertisements. Within the mobile app industry, this method of advertising within games and apps has become a significant source of revenue for game and app publishers, and a relied-upon method for advertisers to reach audiences with engaging content. Further, this way of monetizing applications has an entire industry of platform providers who sell and deliver advertising content into applications on behalf of an application developer or publisher.

In addition, mobile phones are now capable of powering augmented reality experiences, where one or more phone cameras are used to recognize objects and features in an environment surrounding the phone, and track motion of the phone, allowing apps to render digital content into the physical environment via a display.

BRIEF DESCRIPTION OF THE DRAWINGS

Further features and advantages of example embodiments of the present invention will become apparent from the following detailed description, taken in combination with the appended drawings, in which.

It will be noted that throughout the appended drawings, like features are identified by like reference numerals.

DETAILED DESCRIPTION

Figure 1:
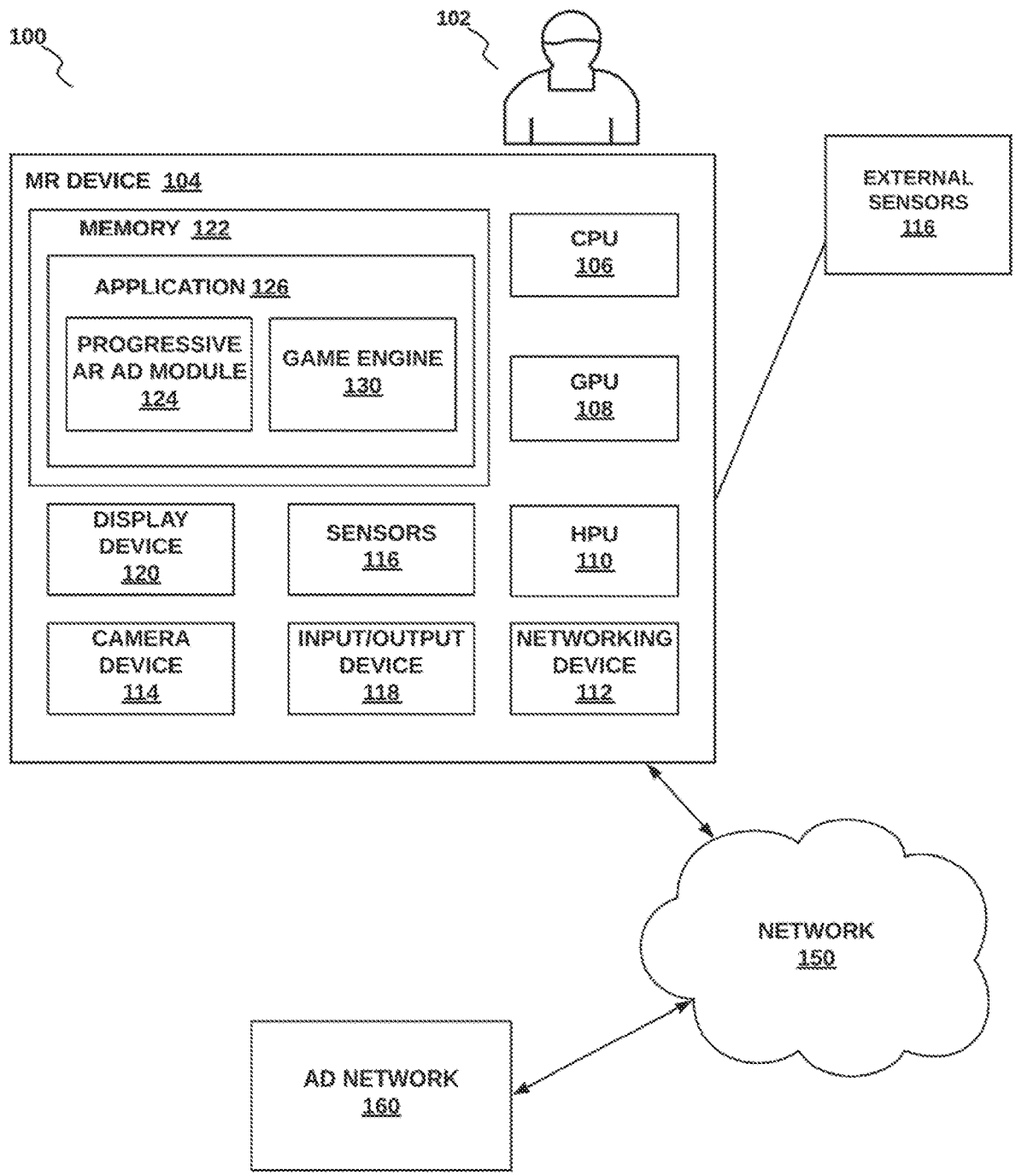
FIG. 1 is a schematic illustrating a progressive AR ad system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'advertising content' and 'ad content' used throughout the description herein should be understood to include all forms of media including images, videos, audio, text, 3d models (e.g., including textures, materials, meshes, and more), 3d playable animations, vector graphics, and the like.

The term 'environment' used throughout the description herein is understood to include 2D digital environments (e.g., 2D video game environments, 2D simulation environments, 2D content creation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'game object', used throughout the description herein is understood to include any digital object or digital element within an environment. A game object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'game object' may also be understood to include linked groups of individual game objects. A game object is associated with data that defines properties and behavior for the object.

The terms 'asset', 'game asset', and 'digital asset', used throughout the description herein are understood to include any data that can be used to describe a game object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime.

The term 'build' and 'game build' used throughout the description herein should be understood to include a compiled binary code of a game which can be executed on a device, and which, when executed can provide a playable version of the game (e.g., playable by a human or by an artificial intelligence agent).

The term 'runtime' used throughout the description herein should be understood to include a time during which a program (e.g., an application, a video game, a simulation, and the like) is running, or executing (e.g., executing programming code). The term should be understood to include a time during which a video game is being played by a human user or played by an artificial intelligence agent The terms 'client' and 'application client' used herein are understood to include a software client or software application that accesses data and services on a server, including accessing over a network.

Throughout the description herein, the term 'mixed reality' (MR) should be understood to include all combined environments in the spectrum between reality and virtual reality including virtual reality, augmented reality and augmented virtuality.

Disclosed herein are systems and methods that provide technological solutions to technological problems associated with enabling advertising platforms to deliver augmented reality experiences within an ad unit and in such a way as to minimize user friction involving camera consent.

In example embodiments, a method of performing operations for executing a progressive interactive augmented reality (AR) advertisement display during execution of a running application is disclosed. based on a receiving of a first trigger event from the running application, a first aspect of the progressive AR advertisement is executed within a display window while the application is executing. The first aspect includes an interactive advertisement. Based on a receiving of a second trigger event from within the first aspect of the progressive AR advertisement, a second aspect of the progressive AR advertisement is executed in the display window while the application is executing. The second aspect includes an interactive AR advertisement.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations.

Turning now to the drawings, systems and methods, including non-routine or unconventional components or operations, or combinations of such components or operations, for providing a progressive AR advertisement in accordance with embodiments of the invention are illustrated. In many embodiments, an interactive 3D ad unit is presented via a display device to a user (e.g., a consumer) as an engaging initial consumer experience, regardless of whether the user consents to turning on a device camera (e.g., to see 3D content in augmented reality). Later, based on receiving consent (e.g., from the user) to access the camera, the experience is enhanced to incorporate 3D content displayed onto the display device in conjunction with a view of the real-world environment via data from the camera (e.g., an interactive 3D AR ad associated with the interactive 3D ad). Based on receiving negative consent, or an absence of receiving consent, the consumer may still have a functional and satisfying experience via the interactive 3D ad unit. The systems and methods described herein provide an interactive 3D ad experience on top of an executing application at a predetermined time, as well as delaying a request for consent to enter into an augmented reality version of the interactive 3D ad. The process allows for control over a displaying and executing of the ads or experiences received by a device, and also provides a frictionless way for brands to engage users via interactive 3D ads and associated interactive 3D AR ads.

A progressive AR advertising system (or 'progressive AR ad' system) and associated methods are described herein. In accordance with an embodiment, the progressive AR ad system is configured to display advertising data (e.g., in an interactive playable ad format) to a user within an MR environment on a MR device while an application (e.g., game) is simultaneously executing on the MR device, the displaying triggered by the application. In an example embodiment, a user (e.g., a wearer of an HMD, or someone holding a smartphone, tablet, or other MR-capable device) experiences the MR environment as presented by the progressive AR ad system via the MR device. The MR environment includes a view of the real world (e.g., a view of MR device immediate surroundings) along with virtual content provided by the progressive AR ad system. The MR device, in some embodiments, includes a forward-facing camera configured to capture digital video or images of the real world around the user, optionally including depth data, which the progressive AR ad system may analyze to provide some of the MR features described herein (e.g., as described with respect to FIG. 2).

In accordance with an embodiment, FIG. 1 is a diagram of an example progressive AR ad system 100 and associated devices configured to provide progressive AR ad functionality to a user 102. In the example embodiment, the progressive AR ad system 100 includes a MR device 104 operated by the user 102 coupled in networked communication with an advertising network 160 via a network 150 (e.g., a cellular network, a Wi-Fi network, the Internet, and so forth). The MR device 104 is a computing device capable of providing a mixed reality experience to the user 102. In some embodiments, the MR device 104 is a head-mounted display (HMD) device worn by the user 102, such as an augmented reality (AR) or virtual reality (VR) visor (e.g., Google Glass®, HTC Vive®, Microsoft HoloLens®, and so forth). In other embodiments, the MR device 104 is a mobile computing device, such as a smartphone or a tablet computer.

In the example embodiment, the MR device 104 includes one or more central processing units (CPUs) 106 or graphics processing units (GPUs) 108. The MR device may include one or more holographic processing units (HPUs) 110. The MR device 104 also includes a one or more networking devices 112 (e.g., wired or wireless network adapters) for communicating across the network 150. The MR device 104 further includes one or more camera devices 114 which may be configured to capture digital video of the real world near the MR device 104 during operation. The MR device 104 may also include one or more sensors 116, such as a global positioning system (GPS) receiver (e.g., for determining a GPS location of the MR device 104), biometric sensors (e.g., for capturing biometric data of the user 102), motion or position sensors (e.g., for capturing position data of the user 102 or other objects), depth sensors, or an audio microphone (e.g., for capturing sound data). Some sensors 116 may be external to the MR device 104, and may be configured to wirelessly communicate with the MR device 104 (e.g., such as used in the Microsoft Kinect®, Vive Tracker™, MIT's Lidar sensor, or MIT's wireless emotion detector).

The MR device 104 also includes one or more input devices 118 such as, for example, a keyboard or keypad, mouse, pointing device, touchscreen, or hand-held device (e.g., hand motion tracking device), and the like, for inputting information in the form of a data signal readable by the processing device 106.

In accordance with an embodiment, the MR device 104 further includes one or more display devices 120, such as a touchscreen of a tablet or smartphone, or lenses or visor of a VR or AR head mounted display (HMD), which may be configured to display virtual objects to the user 102 in conjunction with a real world view. The display device 120 may be driven or controlled by one or more GPUs 108. The GPU 108 processes aspects of graphical output that assists in speeding up rendering of output through the display device 120. In accordance with an embodiment, the MR device 104 may also include a visor (not shown) which acts as a "screen" or surface on which the output of the display device 120 appears, and through which a user experiences virtual content.

The MR device 104 also includes a memory 122 configured to store a progressive AR ad module 124. The memory 122 can be any type of memory device, such as random access memory, read only or rewritable memory, internal processor caches, and the like. The memory also stores an application 126 (e.g., executed by the CPU 106 or GPU 108) that communicates with the display device 120 and also with other hardware such as the input/output device(s) 118 to present a digital environment (e.g., a 3D video game, a 3D content creation environment, a mixed reality display, a mobile application, and the like) on the display device 120. In accordance with an embodiment, the application 126 may include the progressive AR ad module 124 that performs operations as described below with respect to FIG. 2. Furthermore, the memory 122 may also store a game engine 130 (e.g., executed by the CPU 106 or GPU 108) that communicates with the display device 120 and also with other hardware such as the input/output device(s) 118 to present a 3D game environment (e.g., a video game) to the user 102 via the application 126. The game engine 130 would typically include one or more modules that provide the following: animation physics for game objects, collision detection for game objects, rendering, networking, sound, animation, and the like in order to provide the user with a video game (or simulation) environment. Although the progressive AR ad module 124 and the game engine 130 are shown as a part of the application 126, the progressive AR ad module 124 and the game engine 130 may be implemented separately from the application 126 (e.g., as a plugin or as a separate application).

Figure 2:
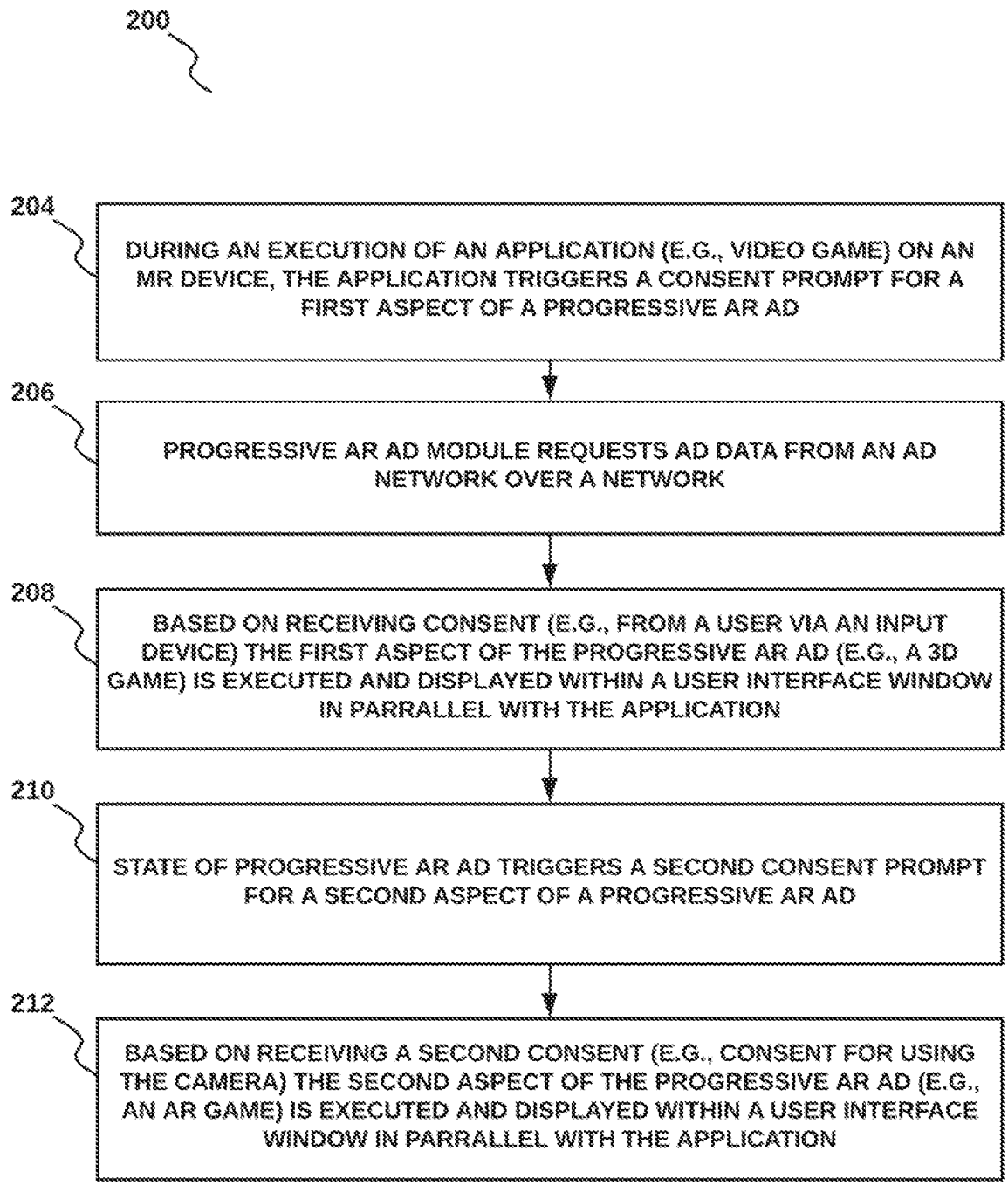
FIG. 2 is a schematic illustrating a method for providing a progressive AR ad using a progressive AR ad system, in accordance with one embodiment.

In accordance with an embodiment, the progressive AR ad system 100 includes an advertising network 160 capable of providing data (e.g., advertising content including 3D data and AR data) for advertisements to be used by and displayed by the progressive AR ad module 124 during operation (e.g., during operations described with respect to FIG. 2). While referred to as an advertising network 160 (or ad network), it may also include an advertising system, monetization system, or advertising platform (e.g., Unity Ads™) that includes integration of in-app purchases and provides a connection to advertising demand sources.

In accordance with an example embodiment, the progressive AR ad module 124, executing on the MR device 104 (e.g., an HMD), may be configured to capture data from the camera device 114 or sensors 116. In the example embodiment, the camera device 114 and sensors 116 capture data from a surrounding environment, the data including video data, audio data, depth data, GPS location data, and the like. The progressive AR ad module 124 may be configured to analyze the captured data directly, or analyze captured data which has been preprocessed by an additional module (e.g., the preprocessed data may include a real-time list of detected and identified objects, object shape data, depth maps, and the like). In some embodiments the preprocessed captured data may be provided by an operating system module or API or software development kit (SDK) provided by an operating system manufacturer (e.g., including ARCore™ SDK from Google™ and ARKit™ SKD from Apple™). In accordance with an embodiment, the progressive AR ad module 124 is implemented as a software development kit (SDK).

In some embodiments, the progressive AR ad system 100 and the various associated hardware and software components described herein may provide AR content instead of, or in addition to, VR content (e.g., in a mixed reality (MR) environment). It should be understood that the systems and methods described herein may be performed with AR content and, as such, the scope of this disclosure covers both AR and VR applications.

In accordance with an embodiment and shown in FIG. 2 is a method 200 for providing a progressive AR ad via a progressive AR ad system 100 (e.g., as described in FIG. 1). In accordance with an embodiment, while performing operations included within the method 200, an application 126 (e.g., a video game) is executing on the MR device 104. The application 126 may be interacted with by a user 102 via the MR device 104 (e.g., the user 102 may be playing a video game application and may be interacting with the sensors 116, camera device 114, display device 120 and input devices 118 during play). The application 126 may use the game engine 130 to execute operations associated with the application (e.g., gameplay operations predetermined by a game developer) and display results of the operations to the user 102 via the display device 120.

In accordance with an embodiment, at operation 204 of the method 200, the application 126 generates a trigger for displaying of a prompt for a progressive AR ad. The application 126 may send the trigger to the progressive AR ad module 124. The prompt may be a user interface element displayed on the display device 120 that presents a call to action for the user 102, wherein the call to action includes a request for consent to execute and display a first aspect of the progressive AR ad (e.g., a request for consent to execute and display an interactive 3D ad game). In accordance with an embodiment, the generating of the trigger may be in response to user interaction with the application 126, wherein the interaction may be predetermined (e.g., by a creator of the application) to generate the trigger. In accordance with an embodiment, based on the application being a game, the generating of the trigger may be initiated by a game state, wherein the game state which triggers the displaying may be predetermined (e.g., by a creator of the game). For example, a trigger generating game state may be a state wherein the user 102 reaches a point in the game, or performs an action in the game, obtains a score, or the like.

In accordance with an embodiment, at operation 206 of the method 200, the progressive AR ad module 124 may communicate with an ad network 160 over a network 150 in order to request and download advertisement data (e.g., advertising content) for the progressive AR ad. The advertisement data may include advertising content which may be presented in any form, including a playable ad (e.g., a 2D video game, a 3D video game, and AR game). In accordance with other embodiments, the progressive AR ad module 124 may search the memory 122 on the MR device 104 for advertisement data (e.g., advertising content) for the progressive AR ad. In accordance with an embodiment, the advertisement data may include data describing a first aspect of a progressive AR ad and a second aspect of a progressive AR ad.

In accordance with an embodiment, at operation 208 of the method 200, based on the progressive AR ad module 124 receiving consent from the prompt (e.g., as part of operation 204, for example after a user has pressed a button to agree to consent), the progressive AR ad module 124 executes the first aspect of the progressive AR ad, which may include an interactive 3D environment. In accordance with an embodiment, as part of the execution, the progressive AR ad module 124 generates and displays the progressive AR ad (e.g., an interactive 3D advertisement) within a user interface window. For example, the user interface window may be a sandboxed web browser packaged within the application 126 (e.g., a Webview™). In accordance with an embodiment, the execution of the progressive AR ad may provide a 3D virtual environment via the display device 120 wherein a user 102 can navigate, explore features of a product (e.g., from the ad data and ad content received from the ad network 160), collect items which may relate to the application 126 (e.g., coins, weapons which may relate to a game) and otherwise engage with the presented ad content received from the ad network 160. In accordance with an embodiment, the execution of the progressive AR ad may provide a mini game (e.g., playable ad) which may be played and interacted with (e.g., by the user 102 via the display device 120, sensors 116, and input devices 118). In accordance with an embodiment, the progressive AR ad module 124 executes the progressive AR ad in parallel with the application 126 (e.g., while the application 126 is loaded in a fast access memory (e.g., RAM, CPU cache and the like) and executing). In accordance with an embodiment, the progressive AR ad module 124 does not control the application 126 and may not be capable of pausing the application 126 or of clearing the application 126 from a fast access memory (e.g., RAM, CPU cache and the like). Based on the progressive AR ad module 124 not being able to pause the application 126, or clear the application 126 from memory, the progressive AR ad module is configured to execute the first aspect of the progressive AR ad using a minimum amount of a fast access memory (e.g., RAM, CPU cache and the like). In accordance with an embodiment, the progressive AR ad module 124 may present any type of short-form ad content, long form ad content, and standardized advertising content received from the ad network 160. In accordance with an embodiment, the progressive AR ad module 124 may use a sandboxed web browser window packaged within the game application to execute and display the progressive AR ad. The sandboxing allowing the progressive AR ad to run in security and independently of the application 126.

In accordance with an embodiment, at operation 210 of the method 200, during execution of the first aspect of the progressive AR ad, a second prompt may be displayed by the progressive AR ad module 124 on the display device 120 (e.g., within a user interface window). The second prompt may present a call to action for the user 102, wherein the call to action includes a request for consent to convert the first aspect of the progressive AR ad to the second aspect of the progressive AR ad; including presenting (e.g., executing and displaying) an augmented reality (AR) version of the ad using data from the camera device 114. In accordance with an embodiment, the second prompt may be triggered by the application 126, the progressive AR ad module 124, or the first aspect of the progressive AR ad. In accordance with an embodiment, the generating of the trigger may be in response to user interaction with the first aspect of the progressive AR ad, wherein the interaction may be predetermined (e.g., by a creator of the application 126 or a creator of the first aspect of the progressive AR ad) to generate the trigger. For example, the trigger may be generated based on a user 102 pressing a button, or the like. In accordance with an embodiment, the trigger may be generated based on a state of the first aspect of the progressive AR ad (e.g., after an elapsed time, upon reaching an end point of the first aspect, and the like). In accordance with an embodiment, based on the first aspect of the progressive AR ad being a game, the generating of the trigger may be initiated by a game state, wherein the game state which generates the trigger may be predetermined (e.g., by a creator of the game). For example, a trigger generating game state may be a state wherein the user 102 reaches a point in the game, or performs an action in the game, obtains a score, or the like.

In accordance with an embodiment, at operation 212 of the method 200, based on the progressive AR ad module 124 receiving consent from the prompt (e.g., as part of operation 210, for example due to the user 102 pressing a consent button in the prompt), the progressive AR ad module 124 executed the second aspect of the progressive AR ad, wherein the executing of the second aspect may include executing an AR version of the progressive AR ad (e.g., a version presented in augmented reality via the MR device 104). In accordance with an embodiment, the progressive AR ad module 124 may display the second aspect of the progressive AR ad within a user interface window. For example, the user interface window may be a sandboxed web browser packaged within the application 126 (e.g., a Webview™).

In accordance with an embodiment, as part of operation 212, while executing the second aspect of the progressive AR ad (e.g., the interactive AR version), the progressive AR ad module 124 may communicate with augmented reality modules of an operating system on the MR device 104 (e.g., ARCore™ and ARKit™) to request and receive real-time spatial information describing an environment surrounding the MR device 104. The spatial information data may be generated by the sensors 116, or the camera device 114, and includes data describing the surrounding environment and objects therein. The data may include depth data, and detected object data, camera data and the like. As part of operation 212, the progressive AR ad module uses the spatial information data and the advertising data (e.g., ad content) received during operation 206 to generate and display digital objects for the second aspect of the progressive AR ad on the display device 120. The displaying may combine the progressive AR ad data to the data from the camera 114 in order to generate an augmented reality display on the display device 120.

In accordance with an embodiment, the progressive AR ad module 124 executes the second aspect of the progressive AR ad in parallel with the application 126 (e.g., while the application 126 is loaded in a fast access memory (e.g., RAM, CPU cache and the like) and executing). In accordance with an embodiment, the progressive AR ad module 124 does not control the application 126 and may not be capable of pausing the application 126 or of clearing the application 126 from a fast access memory (e.g., RAM, CPU cache and the like). Based on the progressive AR ad module 124 not being able to pause the application 126, or clear the application 126 from memory, the progressive AR ad module is configured to execute the second aspect of the progressive AR ad using a minimum amount of a fast access memory (e.g., RAM, CPU cache and the like). In accordance with an embodiment, the progressive AR ad module 124 may present any type of short-form ad content, long form ad content, and standardized advertising content received from the ad network 160 as part of the second aspect.

In accordance with an embodiment, after the second aspect of the progressive AR ad is executed (e.g., played by a user 102) for a time (e.g., a time specified within the advertisement data downloaded from the ad network 160), the progressive AR ad module 124 may present (e.g., display on the display device 120) a call to action regarding the progressive AR ad. For example, the call to action may be a presentation of a custom advertising end card presented in order to drive activity around a predetermined key performance indicator for the progressive AR ad received from the ad network 160 in operation 206.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 3:
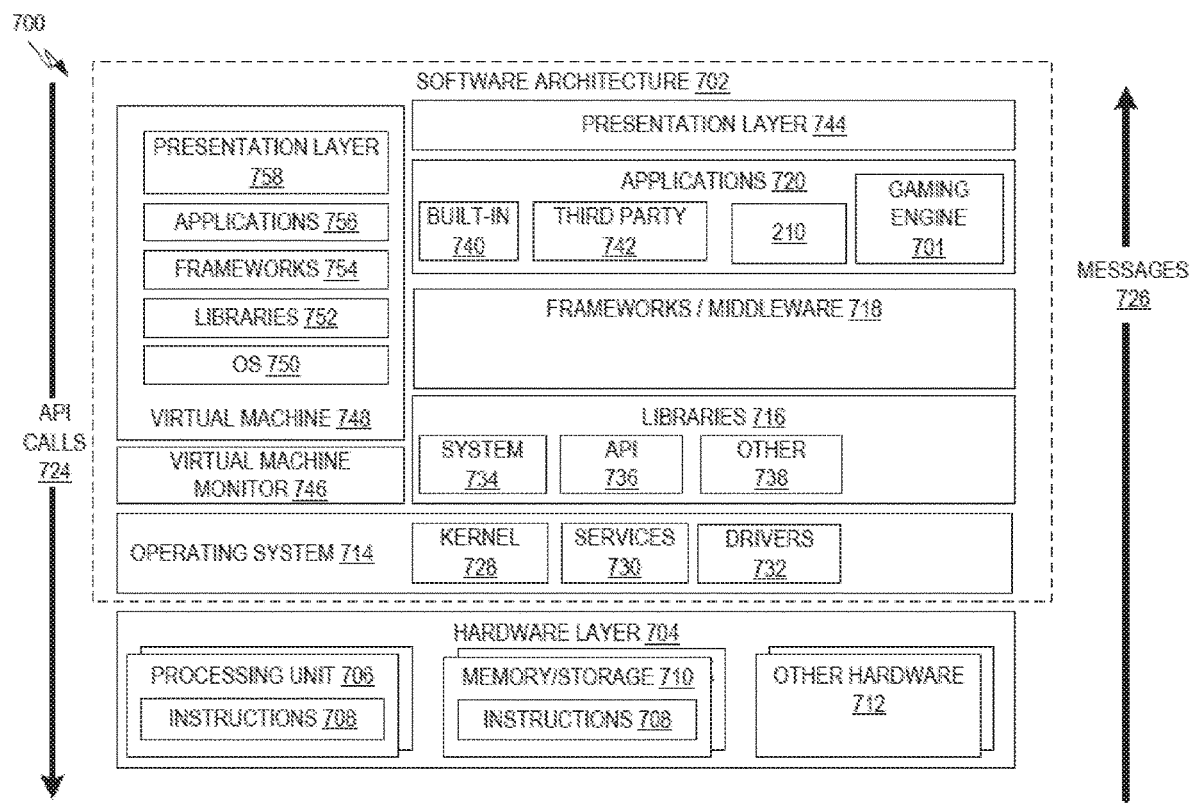
FIG. 3 is a block diagram illustrating an example software architecture, which may be used in conjunction with various hardware architectures described herein.

FIG. 3 is a block diagram 700 illustrating an example software architecture 702, which may be used in conjunction with various hardware architectures herein described to provide a gaming engine 701 and/or components of the progressive AR ad system 100. FIG. 3 is a non-limiting example of a software architecture and it will be appreciated that many other architectures may be implemented to facilitate the functionality described herein. The software architecture 702 may execute on hardware such as a machine 800 of FIG. 4 that includes, among other things, processors 810, memory 830, and input/output (I/O) components 850. A representative hardware layer 704 is illustrated and can represent, for example, the machine 800 of FIG. 4. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 3, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 3, this is illustrated by a virtual machine 748. The virtual machine 748 creates a software environment where applications/modules can execute as if they were executing on a hardware machine (such as the machine 800 of FIG. 4, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 4:
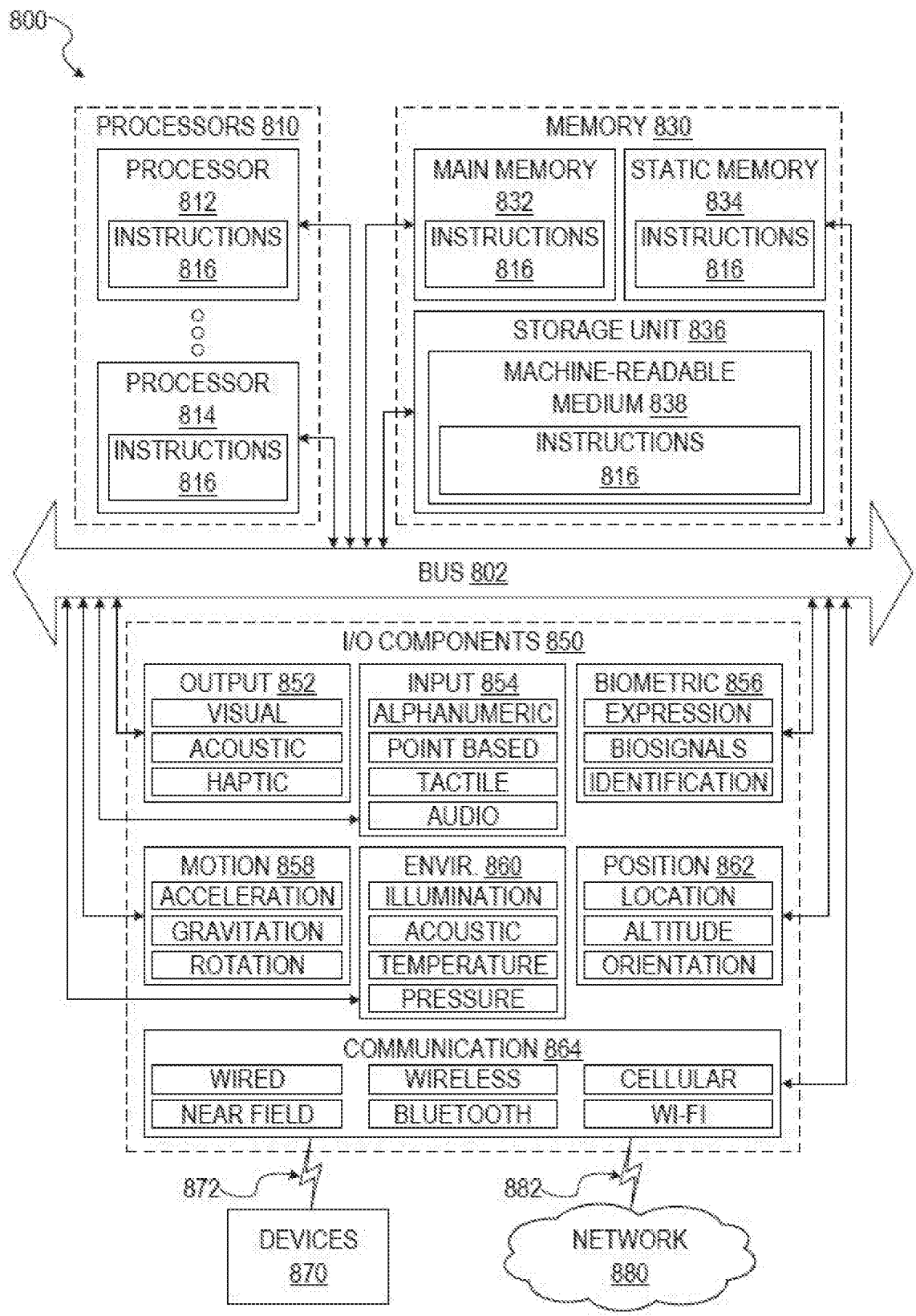
FIG. 4 is a block diagram illustrating components of a machine, according to some example embodiments, configured to read instructions from a machine-readable medium (e.g., a machine-readable storage medium) and perform any one or more of the methodologies discussed herein.

FIG. 4 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 800 is similar to the MR device 104. Specifically, FIG. 4 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 4 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 4. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising:
   one or more computer processors;
   one or more computer memories;
   a set of instructions incorporated into the one or more computer memories, the set of instructions configuring the one or more computer processors to perform operations for executing a progressive augmented reality (AR) advertisement during execution of a running application, the operations comprising:
   based on a receiving of a first trigger event from the running application, requesting advertisement data for the progressive AR advertisement, the advertisement data describing a first aspect of the progressive AR advertisement and a second aspect of the progressive AR advertisement, and executing the first aspect of the progressive AR advertisement via a display device while the application is executing, the executing of the first aspect including executing an interactive three-dimensional version of the progressive AR advertisement based on the advertisement data; and
   based on a receiving of a second trigger event from within the first aspect of the progressive AR advertisement, executing a second aspect of the progressive AR advertisement via the display device while the application is executing, the executing of the second aspect including converting the interactive three-dimensional advertisement into an interactive AR version of the progressive AR advertisement and executing the interactive AR version of the progressive AR advertisement based on the advertisement data.

2. The system of claim 1, wherein the advertisement data for the progressive AR advertisement is received from an advertisement network over a network.

3. The system of claim 1, wherein the operations include:
based on the receiving of the first trigger event, displaying a first prompt via the display device, the first prompt requesting consent for the executing of the first aspect;
receiving a response from the first prompt, the response received by an input device; and
blocking the executing of the first aspect of the progressive AR advertisement based on receiving a negative response to the first prompt.

4. The system of claim 1, wherein the operations include:
based on the receiving of the second trigger event, displaying a second prompt via the display device, the second prompt requesting consent for using data from a camera device to perform operations during the executing of the second aspect;
receiving a response from the second prompt, the response received by an input device; and
blocking the executing of the second aspect of the progressive AR advertisement based on receiving a negative response to the second prompt.

5. The system of claim 1, wherein the executing of the second aspect of the progressive AR advertisement includes the following operations:
receiving data from a camera device, the data including video data describing an environment surrounding the camera device;
receiving the data describing the second aspect of the progressive AR advertisement, the data including AR advertising content and instructions for creating the interactive AR advertisement;
combining the data from the camera device with the data describing the second aspect and creating an augmented reality display on a display device according to the instructions.

6. The system of claim 1, wherein the executing of the first aspect includes displaying the interactive three-dimensional advertisement in a display window that is sandboxed within the application.

7. A non-transitory computer-readable medium storing a set of instructions that, when executed by one or more computer processors, cause the one or more computer processors to perform operations for executing a progressive augmented reality (AR) advertisement display during execution of a running application, the operations comprising:
based on a receiving of a first trigger event from the running application, requesting advertisement data for the progressive AR advertisement, the advertisement data describing a first aspect of the progressive AR advertisement and a second aspect of the progressive AR advertisement, and executing the first aspect of the progressive AR advertisement via a display device while the application is executing, the executing of the first aspect including executing an interactive three-dimensional version of the progressive AR advertisement based on the advertisement data; and
based on a receiving of a second trigger event from within the first aspect of the progressive AR advertisement, executing a second aspect of the progressive AR advertisement via the display device while the application is executing, the executing of the second aspect including converting the interactive three-dimensional advertisement into an interactive AR version of the progressive AR advertisement and executing the interactive AR version of the progressive AR advertisement based on the advertisement data.

8. The non-transitory computer-readable medium of claim 7, wherein the advertisement data for the progressive AR advertisement is received from an advertisement network over a network.

9. The non-transitory computer-readable medium of claim 7, wherein the operations include:
based on the receiving of the first trigger event, displaying a first prompt via the display device, the first prompt requesting consent for the executing of the first aspect;
receiving a response from the first prompt, the response received by an input device; and
blocking the executing of the first aspect of the progressive AR advertisement based on receiving a negative response to the first prompt.

10. The non-transitory computer-readable medium of claim 7, wherein the operations include:
based on the receiving of the second trigger event, displaying a second prompt via the display device, the second prompt requesting consent for using data from a camera device to perform operations during the executing of the second aspect;
receiving a response from the second prompt, the response received by an input device; and
blocking the executing of the second aspect of the progressive AR advertisement based on receiving a negative response to the second prompt.

11. The non-transitory computer-readable medium of claim 7, wherein the executing of the second aspect of the progressive AR advertisement includes the following operations:
receiving data from a camera device, the data including video data describing an environment surrounding the camera device;
receiving the data describing the second aspect of the progressive AR advertisement, the data including AR advertising content and instructions for creating the interactive AR advertisement;
combining the data from the camera device with the data describing the second aspect and creating an augmented reality display on a display device according to the instructions.

12. The non-transitory computer-readable medium of claim 7, wherein the executing of the first aspect includes displaying the interactive three-dimensional advertisement in a display window that is sandboxed within the application.

13. A method comprising:
performing, using one or more computer processors, operations for executing a progressive augmented reality (AR) advertisement display during execution of a running application, the operations comprising:
based on a receiving of a first trigger event from the running application, requesting advertisement data for the progressive AR advertisement, the advertisement data describing a first aspect of the progressive AR advertisement and a second aspect of the progressive AR advertisement, and executing the first aspect of the progressive AR advertisement via a display device while the application is executing, the executing of the first aspect including executing an interactive three-dimensional version of the progressive AR advertisement based on the advertisement data; and based on a receiving of a second trigger event from within the first aspect of the progressive AR advertisement, executing a second aspect of the progressive AR advertisement via the display device while the application is executing, the executing of the second aspect including converting the interactive three-dimensional advertisement into an interactive AR version of the progressive AR advertisement and executing the interactive AR version of the progressive AR advertisement based on the advertisement data.

14. The method of claim 13, wherein the advertisement data for the progressive AR advertisement is received from an advertisement network over a network.

15. The method of claim 13, wherein the operations include:

based on the receiving of the first trigger event, displaying a first prompt via the display device, the first prompt requesting consent for the executing of the first aspect;

receiving a response from the first prompt, the response received by an input device; and blocking the executing of the first aspect of the progressive AR advertisement based on receiving a negative response to the first prompt.

16. The method of claim 13, wherein the operations include:

based on the receiving of the second trigger event, displaying a second prompt via the display device, the second prompt requesting consent for using data from a camera device to perform operations during the executing of the second aspect;

receiving a response from the second prompt, the response received by an input device; and blocking the executing of the second aspect of the progressive AR advertisement based on receiving a negative response to the second prompt.

17. The method of claim 13, wherein the executing of the second aspect of the progressive AR advertisement includes the following operations:

receiving data from a camera device, the data including video data describing an environment surrounding the camera device;

receiving the data describing the second aspect of the progressive AR advertisement, the data including AR advertising content and instructions for creating the interactive AR advertisement;

combining the data from the camera device with the data describing the second aspect and creating an augmented reality display on a display device according to the instructions.

18. The method of claim 13, wherein the executing of the first aspect includes displaying the interactive three-dimensional advertisement in a display window that is sandboxed within the application.

* * * * *